United States Patent [19]

Koskan et al.

[11] Patent Number: 5,219,952

[45] Date of Patent: Jun. 15, 1993

[54] PRODUCTION OF HIGH MOLECULAR WEIGHT POLYSUCCINIMIDE AND HIGH MOLECULAR WEIGHT POLYASPARTIC ACID FROM MALEIC ANHYDRIDE AND AMMONIA

[75] Inventors: Larry P. Koskan, Orland Park; Abdul R. Y. Meah, Justice, both of Ill.

[73] Assignee: Donlar Corporation, Bedford Park, Ill.

[21] Appl. No.: 948,907

[22] Filed: Sep. 18, 1992

[51] Int. Cl.[5] .................. C08G 73/10; C08G 85/00
[52] U.S. Cl. ..................... 525/419; 525/420; 528/363; 528/328
[58] Field of Search ............... 525/419, 420; 528/363, 528/328

[56] References Cited

U.S. PATENT DOCUMENTS

| | | | |
|---|---|---|---|
| 4,517,241 | 5/1985 | Alpert | 428/332 |
| 4,839,461 | 6/1989 | Boehmko | 528/363 |
| 5,116,513 | 5/1992 | Koskan et al. | 210/698 |
| 5,142,062 | 8/1992 | Knebel et al. | 558/545 |
| 5,152,902 | 10/1992 | Koskan et al. | 210/698 |

*Primary Examiner*—Joseph L. Schofer
*Assistant Examiner*—M. Nagumo
*Attorney, Agent, or Firm*—Dressler, Goldsmith, Shore, Sutker & Milnamow, Ltd.

[57] ABSTRACT

A method of producing high molecular weight polysuccinimide and high molecular weight polyaspartic acid. Reacting maleic anhydride with ammonia and further reacting with polymerized polysuccinimide. Hydrolyzing the resultant product to form polyaspartic acid.

10 Claims, No Drawings

PRODUCTION OF HIGH MOLECULAR WEIGHT POLYSUCCINIMIDE AND HIGH MOLECULAR WEIGHT POLYASPARTIC ACID FROM MALEIC ANHYDRIDE AND AMMONIA

FIELD OF THE INVENTION

The invention is in the field of polymer formation. More particularly, the invention is in the field of polysuccinimide and polyaspartic acid formation.

BACKGROUND

Polyaspartic acid has been formed by a number of methods.

Koskan et al., U.S. Pat. No. 5,116,513, teaches the formation of polyaspartic acid by the polymerization of aspartic acid powder. The polymerization produces a polysuccinimide, which can be base hydrolyzed to polyaspartic acid.

Boehmke et al., U.S. Pat. No. 4,839,461 teaches the production of polyaspartic acid by reacting maleic acid and ammonia in a molar ratio of 1:1 to 1.5 at 120°–150° C.

SUMMARY

We have discovered that polysuccinimide can be produced with unexpectedly high yields using maleic anhydride and ammonia at elevated temperatures. The resulting polysuccinimide can be base hydrolyzed to produce polyaspartic acid.

We have discovered that at elevated temperatures above at least 170° C. a low molecular weight polysuccinimide having a molecular weight within the range of 1000–2000 Mw can be produced in yields exceeding 60%.

At temperatures less than 150° C. the maleic anhydride forms an adduct with ammonia. Adding previously formed polysuccinimide prior to elevating the temperature above 200° C. results in a relatively high molecular polysuccinimide having a weight average molecular weight of greater than 3000. A weight average molecular weight greater than 12,000 is achievable. In the preferred embodiments the molecular weight will exceed 3000 Mw. In the more preferred embodiments the molecular weight will be within the range of from 3200 to 12,000. In the most preferred embodiment, the molecular weight will be within the range of from 3200 to 10,000.

The preferred polymerization temperature range is from 200° C to 260° C. A more preferred polymerization temperature range is from 220° C. to 260° C. The most preferred polymerization temperature range is from 220° C. to 240° C.

The yield can be increased by increasing the length of the reaction. For optimization of yield generally, 6 to 14 hours is preferred. More preferred is 7 to 10 hours.

Increasing the amount of ammonia relative to the amount of maleic anhydride can also increase yield. For optimization, generally, 1 to 12 times the number of moles of maleic anhydride is preferred, two to five times is more preferred, and two to three times is most preferred.

DESCRIPTION OF THE PREFERRED EMBODIMENTS

A series of experiments were performed to determine the appropriate conditions for producing polysuccinimide from maleic anhydride and ammonia.

The experiments utilized maleic anhydride. However, maleic anhydride equivalents such as maleic acid and its salts are useable.

For purposes of this invention, the term "polyaspartic acid" includes the salts of polyaspartic acid.

The experiments are described below, as follows:

PRODUCTION OF ADDUCT AND LOW MOLECULAR WEIGHT POLYMER

Example 1

98 grams of maleic anhydride (1 mole) were slurried with 50 grams of water and heated to 55° C. for 30 minutes in an oil bath. 68 grams of 30% Ammonium hydroxide was then added and the mixture heated for four hours at an oil bath temperature of 130° C.(a reaction mixture temperature of 115° C.). The product produced a positive Biuret test for peptide. After hydrolysis, Gel Permeation Chromatography (hereinafter designated as GPC) clearly showed that less than 10% of any polymer was formed. Titration confirmed this result.

Example 2

98 grams(1 mole) of maleic anhydride were slurried with 50 grams of water and heated at 75° C for 30 minutes in order to melt the maleic anhydride. The mixture was placed in a water bath, cooled to room temperature, and 68 grams (1 mole) of 30 wt% ammonium hydroxide was added dropwise to minimize ammonia loss during the exotherm.

Upon completion of the ammonia addition, stirring commenced, and a temperature of 75°–85° C. was attained and maintained for 2–3 hours producing a glassy, white substance.

The product was transferred to a reaction vessel and heated to 135° C. oil bath temperature for a reaction mixture temperature 115° C. During the four hours of heating, water formation indicative of a condensation reaction was observed. Upon completion of the reaction, a brittle solidified product was observed. After hydrolysis, GPC clearly showed the presence of a small amount of polymer. Titration showed about 20% polymer.

Example 3

The product of Example 2 was ground; 15 grams were placed in a test tube and heated for 4–5 hours at a 150° C. oil bath temperature (140° C. reaction mixture temperature). After hydrolysis, GPC data showed the presence of a polymer shoulder. Titration showed 30% polymer.

Example 4

The product of Example 2 was ground; 15 grams were placed in a test tube and heated for 5 hours at 180° C. oil bath temperature (170° C. reaction mixture temperature). After hydrolysis, GPC data clearly showed about 50% polymer. Titration data confirmed this amount.

Example 5

The product of Example 2 wa ground; 20 grams were placed in a test tube and heated in an oil bath for 5 hours at 220° C. The product was water insoluble. GPC analysis of the hydrolyzed product evidenced a strong polyaspartic acid peak. Titration showed 90% polysuccinimide.

Example 6

98 grams of maleic anhydride were slurried with 50 grams of water and heated at 75° C. for 30 minutes in order to melt the maleic anhydride. The mixture was placed in a water bath, cooled to room temperature, and 68 grams of 30 wt% ammonium hydroxide was added dropwise to minimize ammonia loss during the exotherm.

Upon completion of the ammonia addition, stirring commenced, and a temperature of 75°–85° C. was attained and maintained for 2–3 hours producing a glassy, white substance.

The product was transferred to a reaction vessel and heated to a 125° C. oil bath temperature (reaction mixture temperature 110° C. During the four hours of heating, water formation indicative of a condensation reaction was observed. Upon completion of the reaction, a brittle solidified product was observed. GPC showed the presence of no polymer. Titration data showed less than 5% polysuccinimide formation.

Example 7

196 grams (2 moles) of maleic anhydride were slurried with 100 grams of water and heated at 75° C. for 45 minutes in order to melt the maleic anhydride. The mixture was placed in a water bath, cooled to room temperature, and 204 grams (3 moles) of 30 wt% ammonium hydroxide was added dropwise to minimize ammonia loss during the exotherm.

Upon completion of the ammonia addition, stirring commenced, and a temperature of 75°–85° C. was attained and maintained for 6 hours producing a glassy, white substance.

The product was transferred to a reaction vessel and heated in an oil bath temperature to a reaction mixture temperature 20° C. with a corresponding oil bath temperature of 135° C. During the fourteen hours of heating, water formation indicative of a condensation reaction was observed. Upon completion of the reaction, a yellowish hard material was observed. Titration showed 0% polymer. GPC results were consistent with the titration.

Example 8

196 grams (2 moles) of maleic anhydride were slurried with 100 grams of water and heated to 55° C. with stirring for 45 minutes. The mixture was cooled to room temperature; 408 grams (6 moles) of 30 wt % aqueous ammonium hydroxide was slowly added with cooling to minimize ammonia loss. Upon completion of the addition, the mixture was heated to 75°–85° C. for 6 hours, and a white glassy substance was observed. This was heated in an oil bath to a reaction mixture of 240° C. (with a corresponding oil bath temperature of temperature 250° C.) for 7 hours and a dark yellow brittle product was obtained. Titration showed 100% polymer. This was confirmed by GPC of the hydrolyzed product.

In the Examples presented above, polysuccinimide was formed in significantly greater yields at temperatures above 150° C. At temperatures of 150° C. or lower a maleic anhydride/ammonia adduct was formed. It appears that at elevated temperatures that adduct participated in a polymerization reaction. Once the 200° C. threshold was reached or surpassed GPC and titration studies gave clear evidence of polysuccinimide formation, and under these elevated temperatures the yield was high, over 70%. At temperatures above 220° C. the yield attained the maximum of 100% of theoretical and generally exceeded 90% of theoretical. At temperatures above 150° C., a yield of 60% theoretical was obtained. At temperatures exceeding 170° C., at least 70% of the theoretical yield was obtained.

PRODUCTION OF HIGH MOLECULAR WEIGHT POLYSUCCINIMIDE

Example 9

The product of Example 2 is placed in a test tube and mixed with half its weight of previously formed polysuccinimide which has a weight average molecular weight of 3000. The reaction mixture is heated to 220° C. for a period of 10 hours. A polysuccinimide having a molecular weight of 10,000 is produced. The polysuccinimide product is base hydrolyzed using ammonium hydroxide t produce polyaspartic acid.

Example 10

The product of Example 2 was placed in a test tube and mixed with a previously formed low molecular weight polysuccinimide, having a weight average molecular weight of 1000. The reaction mixture was heated to 220° C. for a period of 10 hours. A polysuccinimide having a molecular weight of 6000 was produced. The polysuccinimide product was base hydrolyzed using ammonium hydroxide to produce polyaspartic acid.

Example 11

The product of Example 9 is placed in a test tube, mixed with and reacted with the product of Example 10. The reaction mixture is heated to 220° C. for 12 hours. A polysuccinimide have a molecular weight of 12,000 is produced. The product is base hydrolyzed to form a polyaspartic acid.

Examples 9 through 11 show that molecular weight of the polymer can be increased by using previously formed polysuccinimide and adding it to the reaction mixture.

Having described our invention, we claim as follows:

1. A method of producing a polysuccinimide, comprising the steps
   1) of reacting maleic anhydride and ammonia at a temperature less than 150° C. to form a product;
   2) mixing the reaction product of step one with a polysuccinimide; and
   3) then raising the temperature of step 2 to a temperature to effect polymerization of the product of step 1 with the polysuccinimide.

2. The method of claim 1, wherein the temperature of step 3 is at least 200° C.

3. The method of claim 1, wherein the temperature of step 3 is at least 170° C.

4. The method of claim 3, wherein the polysuccinimide used in step 2, was produced by heating a maleic anhydride and ammonia first at a temperature of less than 80° C. for a period of time sufficient to form a product, and then at a temperature within the range of 220° C. to 260° C.

5. The method of claim 3, wherein the polysuccinimide used in step 2, was produced by heating aspartic acid powder at a temperature of at least 420° F.

6. The method of claim 3, further including the step of adding a base to the final product of claim 3 to produce polyaspartic acid.

7. The method of claim 1, wherein step one, the maleic anhydride and the ammonia are first reacted at a temperature of less than 75° C. to form a product.

8. The method of claim 1, wherein step one, the maleic anhydride and the ammonia are first reacted at a temperature of about 55° C. or less to form a product.

9. The method of claim 1, wherein the temperature of step 3 is in the range 200° C. to 230° C.

10. The method of claim 9, further including the step of base hydrolyzing the final product of claim 4 to produce polyaspartic acid.

* * * * *